C. C. LOOMIS.
SLIDE BUSHING FOR PISTOLS.
APPLICATION FILED DEC. 4, 1919.
1,348,284.
Patented Aug. 3, 1920.
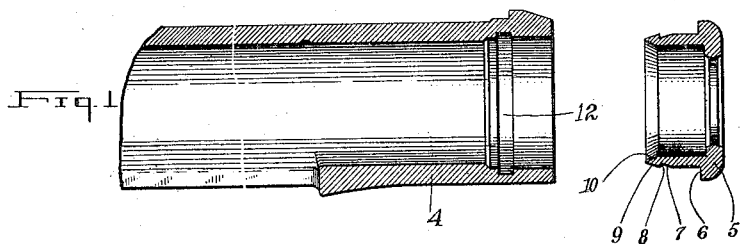
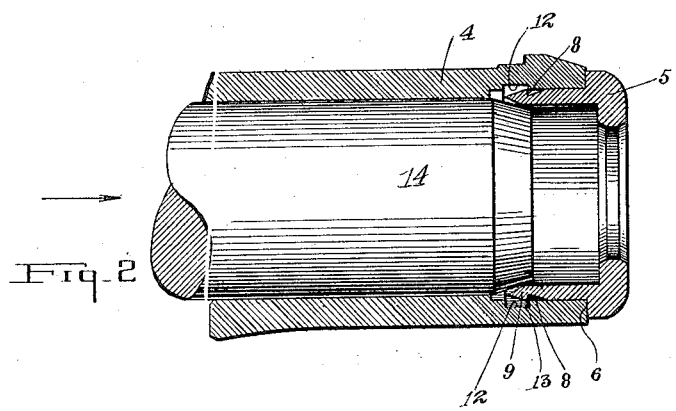
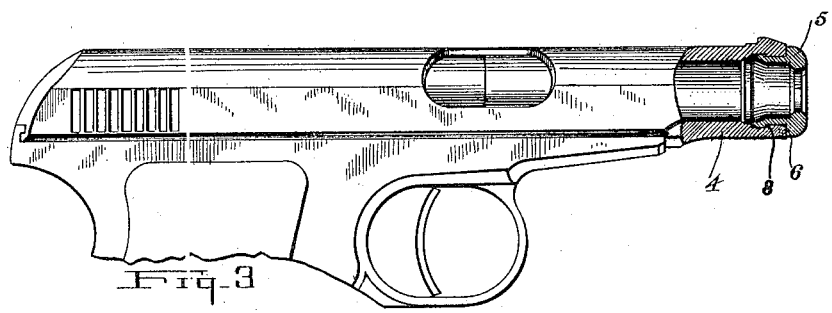
WITNESSES:
INVENTOR
CRAWFORD C. LOOMIS
BY
ATTORNEY

UNITED STATES PATENT OFFICE.

CRAWFORD C. LOOMIS, OF ILION, NEW YORK, ASSIGNOR, BY MESNE ASSIGNMENTS, TO REMINGTON ARMS COMPANY, INC., OF NEW YORK, N. Y., A CORPORATION OF DELAWARE.

SLIDE-BUSHING FOR PISTOLS.

1,348,284.     Specification of Letters Patent.     Patented Aug. 3, 1920.

Application filed December 4, 1919. Serial No. 342,397.

*To all whom it may concern:*

Be it known that I, CRAWFORD C. LOOMIS, a citizen of the United States, residing at Ilion, in the county of Herkimer and State of New York, have invented certain new and useful Improvements in Slide-Bushings for Pistols, of which the following is a specification.

This invention relates to improvements in slide bushings for pistols and has for its object to provide an improved method and means for connecting the slide bushing of an automatic pistol or the like to the slide without the use of screw threads or similar detachable connecting means.

A further object is to provide a slide bushing which can be readily and cheaply made by automatic machinery and which can be quickly, cheaply and permanently secured to the slide by expanding the bushing into a recess in the slide by a tapered punch or other expanding tool.

One embodiment of my invention is shown in the attached drawings, wherein:—

Figure 1 is a partial sectional view of the action slide of an automatic pistol and a slide bushing ready to be inserted in the slide.

Fig. 2 shows the bushing in the slide and a punch in position to expand the bushing, and Fig. 3 is a view of the slide and bushing combined.

In said drawing the numeral 4 indicates the slide and 5 the bushing. The bushing is formed with an annular shoulder 6 and a groove 7 spaced therefrom, said groove forming preferably a substantially square shoulder 8. Beyond the groove the bushing is formed with an outer bevel 9 and an inner bevel 10. The slide is formed with an inner groove 12 of any desired form provided preferably with a substantially square shoulder 13.

The parts are so proportioned that the shoulder 8 will be alined with the shoulder 13 when the shoulder 6 abuts the end of the slide. In this position of the parts a tapered punch 14 or other expanding means is brought to bear upon the bushing to expand its rearward portion into the groove 12 as shown in Fig. 3. During this operation the shoulder 8 passes behind the shoulder 13 and a further movement causes a bending of the metal about the shoulder 13 as a center with the result that the metal of the bushing is stretched longitudinally into the position shown in Fig. 3. The bushing is therefore permanently under tensile stress between the shoulders 6 and 8 and is rigidly held in position.

It will be seen that I have provided a simple, cheap and permanent way for attaching the slide bushing to the slide without the use of screw threaded or other detachable connections which would be unreliable under the severe service conditions of an automatic firearm.

What I claim as new and desire to secure by Letters Patent of the United States, is;

1. In firearms, an action slide formed with a substantially cylindrical passage having an annular recess spaced from the end thereof, and a bushing in said slide having an annular projection extending into said recess whereby said bushing is secured in place in said slide.

2. In firearms, an action slide formed with a substantially cylindrical passage having an annular recess spaced from the end thereof, and a bushing in said slide formed with a flange abutting the end of the slide and having an annular projection extending into said recess.

3. In firearms, an action slide formed with a substantially cylindrical passage having an annular recess spaced from the end thereof, and a bushing in said slide having an annular projection extending into said recess and secured in place thereby, said projection being formed by expanding the bushing into the recess.

4. The method of securing a bushing to an action slide having a cylindrical passage, which consists in forming an internal recess in said passage, forming said bushing with a groove terminating in a shoulder, inserting the bushing in the passage with its shoulder in line with said recess and expanding a portion of the bushing into said recess.

5. The method of securing a bushing to an action slide having a cylindrical passage, which consists in forming an internal recess in said passage, forming said bushing with a flange and with a groove terminating in a shoulder, inserting the bushing in the passage with its flange abutting against the end of the action slide and with said shoulder in line with said recess and expanding a portion of the bushing into said recess.

6. The method of securing a bushing to an action slide having a cylindrical passage, which consists in forming an internal recess in said passage, forming said bushing with a flange and with a groove terminating in a shoulder, inserting the bushing in the passage with its flange abutting against the end of the action slide and with said shoulder in line with said recess and expanding a portion of the bushing into said recess until the shoulder has passed into said recess and further expanding the bushing whereby the flange is tightly drawn against the end of the action slide and the bushing is solidly held in place.

In witness whereof I have signed my name hereto this 29 day of November, 1919.

CRAWFORD C. LOOMIS.